United States Patent
Su

(10) Patent No.: US 8,146,954 B2
(45) Date of Patent: Apr. 3, 2012

(54) QUICK PLUGGING SET OF PNEUMATIC TOOLS

(76) Inventor: Hui-Chun Su, Siu Shui Hsian (TW)

( * ) Notice: Subject to any disclaimer, the term of this patent is extended or adjusted under 35 U.S.C. 154(b) by 174 days.

(21) Appl. No.: 12/685,104

(22) Filed: Jan. 11, 2010

(65) Prior Publication Data

US 2011/0170943 A1 Jul. 14, 2011

(51) Int. Cl.
*F16L 27/04* (2006.01)
(52) U.S. Cl. .................. 285/261; 285/276
(58) Field of Classification Search .......... 285/276, 285/261, 271
See application file for complete search history.

(56) References Cited

U.S. PATENT DOCUMENTS

| | | | | |
|---|---|---|---|---|
| 2,278,720 A * | 4/1942 | Follet | | 285/276 |
| 4,776,615 A * | 10/1988 | Young | | 285/261 |
| 5,288,110 A * | 2/1994 | Allread | | 285/263 |
| 5,735,552 A * | 4/1998 | Elliott-Moore | | 285/276 |
| 6,003,907 A * | 12/1999 | Gau et al. | | 285/276 |
| 6,846,022 B2 * | 1/2005 | Takagi | | 285/262 |
| 7,419,191 B2 * | 9/2008 | Shu | | 285/276 |
| 7,712,793 B1 * | 5/2010 | Garraffa | | 285/261 |
| 2008/0284165 A1 * | 11/2008 | Chiang | | 285/261 |

* cited by examiner

*Primary Examiner* — David E Bochna

(57) ABSTRACT

A quick plugging set of pneumatic tools including a connector, a steel ball seat and a tailstock, wherein the steel ball seat and the ball head of the connector are integrated completely through stamping and covering by a friction ring coordinated with a holding groove with thin cladding at the outer end of the steel ball seat providing the connector with angle-adjustment feature; a prefabricated covering interpolation segment at the rear portion of the connector integrates with the tailstock, a corresponding ring groove is placed therein, and a bolt hole drilled on the side of the tailstock penetrating the ring groove; a pre-determined number of the steel balls are filled into the ring groove through the bolt hole to provide the connector with rotary movement thus allowing the quick plugging set of pneumatic tools to have arbitrary angle adjustment and flexible rotation.

4 Claims, 5 Drawing Sheets

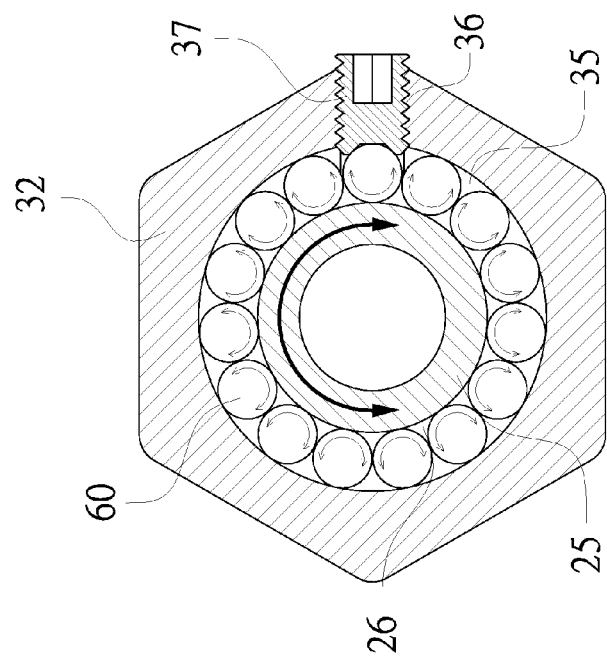
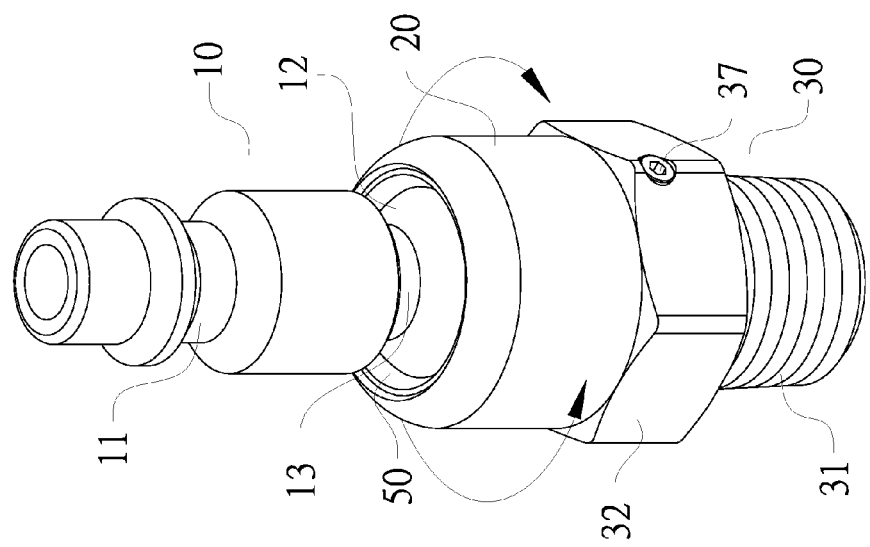
FIG. 8
FIG. 7

QUICK PLUGGING SET OF PNEUMATIC TOOLS

BACKGROUND OF THE INVENTION (a) Field of the Invention

The present invention provides a quick plugging set of pneumatic tools, which is mainly designed for the integrated combinations of a connector and a steel ball seat, and a steel ball seat and a tailstock; wherein through the design of thin cladding placed at outer end of a steel ball seat holding groove, rapid integration of the ball head of the connector and the steel ball seat is achieved; through the placement of a stop-leak rubber ring and a friction ring, the connector is provided with not only arbitrary angle adjustment feature but also good stop-leak effects; and for the combination of the steel ball seat and the tailstock, simple covering interpolation integration coordinated with the filling of steel balls is adopting to maintain the relationship of interpolation and integration and to further provide the steel ball seat and the tailstock with relatively flexible rotation performance, thus deficiencies missing about conventional structure is solved.

(b) Description of the Prior Art

The design for general pneumatic tools mainly adopts air pressure as the driving force to achieve the purpose of driving tool actuation; to achieve operational convenience of such tools, generally, a quick plugging set with arbitrary angle and rotation shift adjustment is designed to be linking component between such tool and transmission piping thereof; through the design about the ball head of the connector, coordinated with the margin of space provided by plugging set holding groove of the tailstock, the ball head of the connector is made to be an axis for arbitrary angle adjustment.

To achieve the torsion angle adjustment performance for such quick plugging set, the tailstock holding groove of convergence tools is generally designed to be with a through hole at one end and the diameter of the through hole is slightly less than that of the ball head of the connector, and the connector is placed inside from another end of the tailstock, in which the connector rod segment passes through the through hole with reducing diameter of the holding groove and is prominent in the outer, and the spacing of the ball head is placed within the holding groove of the tailstock, coordinated with the extended outside lead edge of the holding groove through hole, thus the connector is provided with torsion angle adjustment performance.

Moreover, to achieve the seal and leak-proof performance between the connector and the tailstock, stop-leak rings are usually installed between the two ends of the ball head of the connector and the tailstock holding groove, thus the seal effects between the above both is achieved through such stop-leak ring, to prevent gas and liquid from leakage when rapid plugging set performs flexible torsion angle conversion.

However, in view of the structural design of the existing quick plugging set, the fit structure processing between the ball head of the connector and the tailstock holding groove is not only difficult, but also very susceptible to wear and tear and to produce gaps after a period of usage, so as to reduce the conformability between the ball head and the tailstock holding groove, the absolutely seal relationship between the stop-leak rings installed at the two ends of the ball head and the inner wall of the holding groove is not achieved, thus the seal and leak-proof performance is seriously affected; it is necessary to try to quickly solve and improve the phenomenon.

Moreover, the above design for the quick plugging set only provides the ball head of the connector with arbitrary angle adjustment feature, but without flexible relative rotation performance between the connector and the tailstock, in view of the whole practicality, virtually surviving the limitation of a lack of control flexibility; it is necessary to try to further solve and improve the phenomenon.

SUMMARY OF THE INVENTION

In view of various problems and shortcomings of the composition design for the existing quick plugging set, the inventor undertakes research and improvement based on his many years experience in related industries and technology, and further creates the structure of the quick plugging set of pneumatic tools of the present invention, wherein the main object is to provide the torsion angle adjustment performance required for the quick plugging set by way of the most simple composition through structural composition design, and to enhance and maintain the seal and leak-proof performance.

The another object of the present invention is to further provide the tailstock with flexible rotation performance through structural composition design, besides the arbitrary torsion angle adjustment performance of the connector, so as to effectively raise the control flexibility and use convenience.

To achieve the above objects, the structural design of the present invention is mainly composed of a connector, a steel ball seat, and a tailstock, wherein through the design of thin cladding placed at outer end of a steel ball seat holding groove, rapid integration of the ball head of the connector and the steel ball seat is achieved; through the placement of a stop-leak rubber ring and a friction ring, the connector is provided with not only arbitrary angle adjustment feature but also good stop-leak effects; and for the combination of the steel ball seat and the tailstock, simple covering interpolation integration coordinated with the filling of the steel balls is adopting to maintain the relationship of interpolation and integration and to further provide the steel ball seat and the tailstock with relatively flexible rotation performance, thus deficiencies missing about conventional structure is solved.

BRIEF DESCRIPTION OF THE DRAWINGS

FIG. 7 is a schematic rotation operation view of the preferred embodiment, according to the present invention; and FIG. 8 is a schematic rotation relationship view of the preferred embodiment, according to the present invention.

DESCRIPTION OF MAIN COMPONENT SYMBOLS

Figure 1:
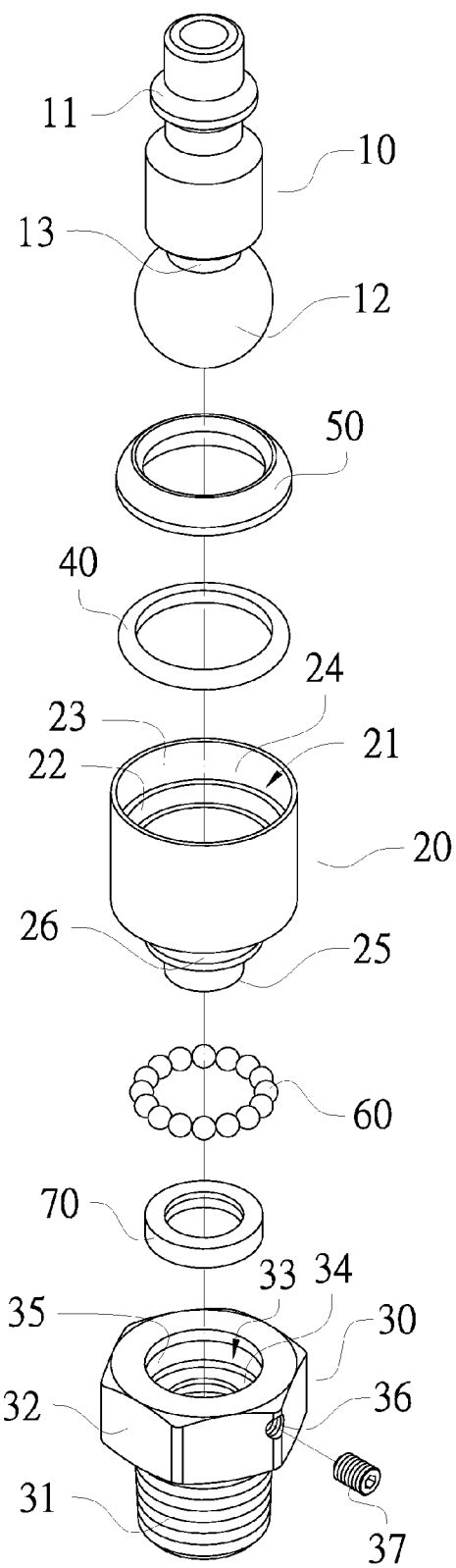
FIG. 1 is a structural exploded schematic view of the preferred embodiment, according to the present invention.

10: Connector
11: Quick plugging connector
12: Ball head
13: Reducing diameter neck
20: Steel ball seat 21: Holding groove
22: Thimble groove
23: Thin cladding
24: Step edge portion
25: Covering interpolation segment
26: Ring groove
30: Tailstock
31: Locking connection segment
32: Hex rod segment
33: Covering interpolation groove
34: Thimble groove
35: Ring groove
36: Bolt hole
37: Bolt pillar
40: Stop-leak rubber ring
50: Friction ring
60: Steel ball
70: Seal ring

DETAILED DESCRIPTION OF THE PREFERRED EMBODIMENTS

Figure 2:
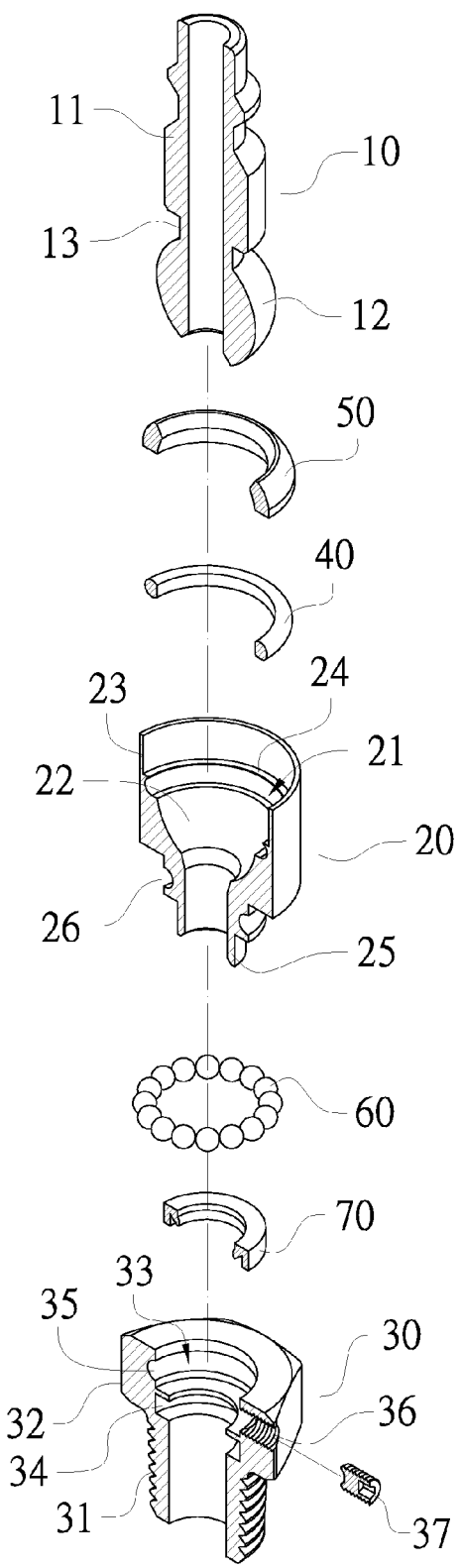
FIG. 2 is a structural exploded schematic view, showing partial section of the preferred embodiment, according to the present invention.
Figure 3:
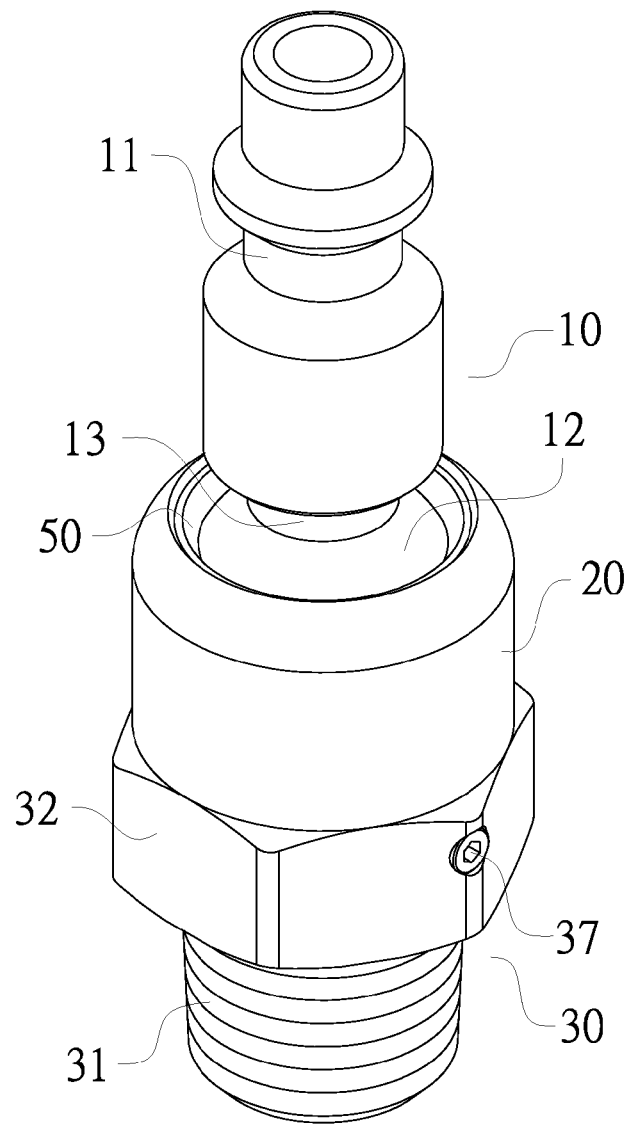
FIG. 3 is a schematic structural combination view of the preferred embodiment, according to the present invention.
Figure 4:
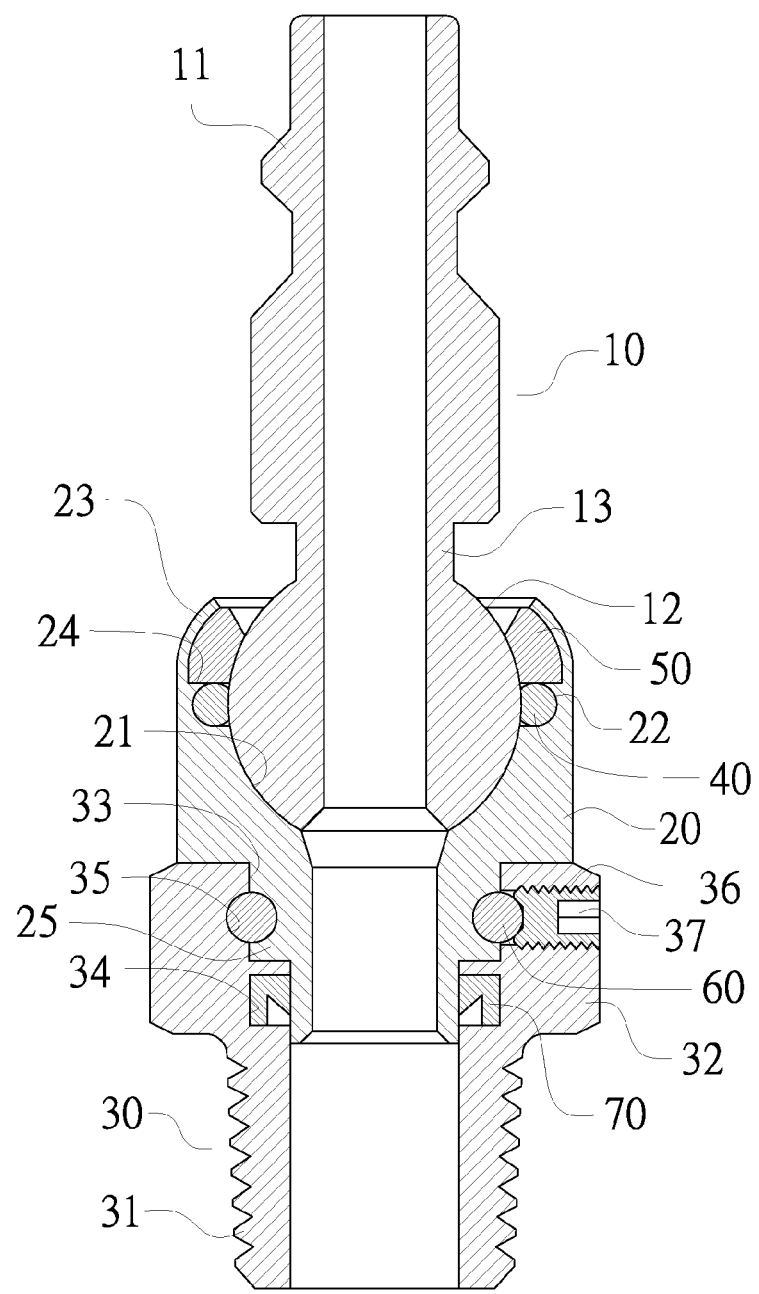
FIG. 4 is a schematic structural relationship view of the preferred embodiment, according to the present invention.
Figure 6:
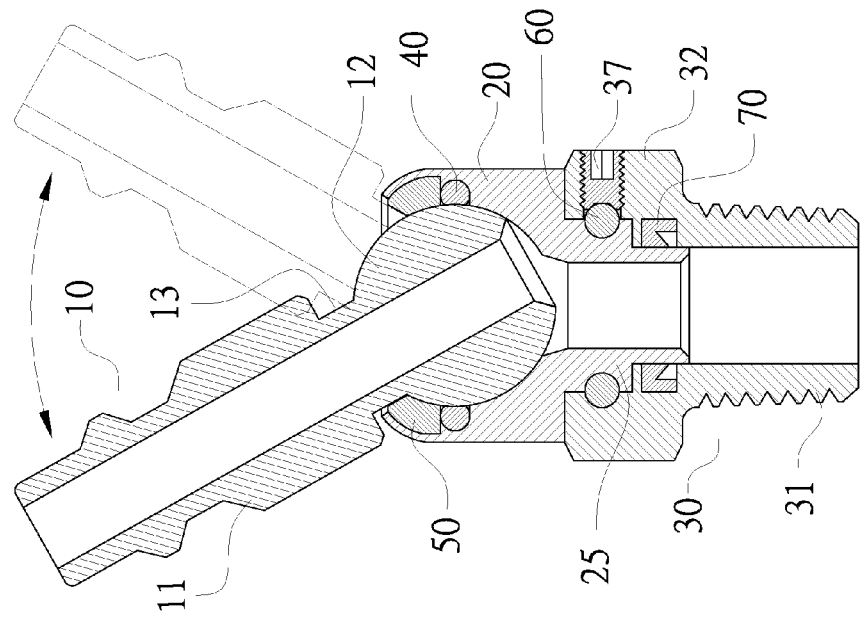
FIG. 6 is a schematic angle adjustment relationship view of the preferred embodiment, according to the present invention.
Figure 5:
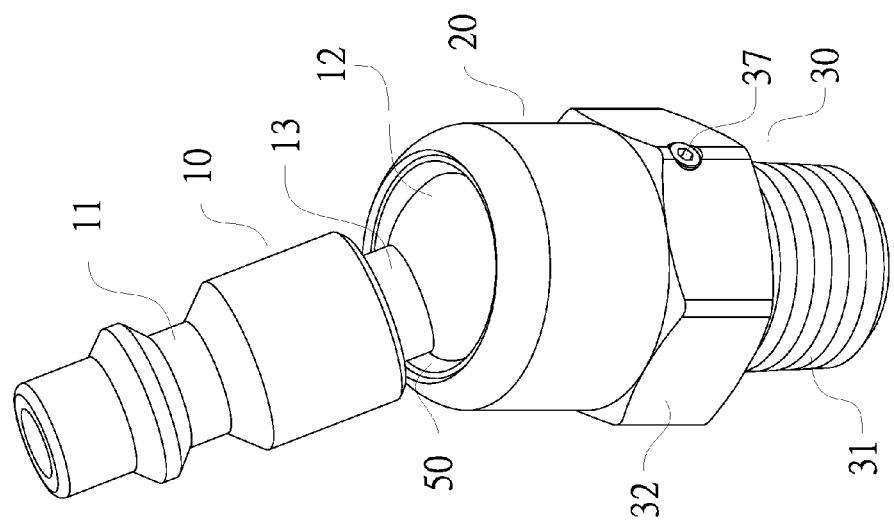
FIG. 5 is a schematic angle adjustment view of the preferred embodiment, according to the present invention.

The detailed description and technical contents of invention are further illustrated with the drawings as following:

Referring to the structural exploded schematic view of FIG. 1, the structural exploded schematic view of partial section of FIG. 2, the schematic structural combination view of FIG. 3, the schematic structural relationship view of FIG. 4, the schematic angle adjustment view of FIG. 5, the schematic angle adjustment relationship view of FIG. 6, the schematic rotation operation view of FIG. 7, and the schematic rotation relationship view of FIG. 8, the drawings collectively show the preferred embodiment of the present invention. The plugging set of pneumatic tools of the present invention includes a connector (10), a steel ball seat (20), and a tailstock (30), wherein:

the connector (10) consists of a quick plugging connector (11) at one end is used for interpolating and connecting with air pressure or oil pressure piping and a ball head (12) at another end; a reducing diameter neck (13) is formed at convergence portion between the ball head (12) and the quick plugging connector (11), allowing the ball head (12) to be placed within a holding groove (21) inside a steel ball seat (20), so as to provide the connector arbitrary torsion angle adjustment performance;

the steel ball seat (20) include a holding groove (21) at one end and a covering interpolation segment (25) at another end; the said holding groove has an increasing diameter for holding the ball head (12) of the connector (10); the outer end of the holding groove (21) consists of a thimble groove (22) installed with a thin 5 cladding (23) with suitable width, and a step edge portion (24) is formed at convergence interface between the thimble groove (22) and the thin cladding (23), to embed a stop-leak rubber ring (40) within the thimble groove (22); after the ball head (12) of the connector (10) is placed into the holding groove (21), a friction ring (50) made of wear-resistant material is plugged inside from the outer end of the connector (10) and is restricted in the step edge portion (24); finally, the thin cladding (23) installed at the outer end of the holding groove (21) is stamped and folded to cover the friction ring (50) to combine the connector (10) with the steel ball seat (20); the covering interpolation segment (25) will be plugged into the tailstock (30), and a ring groove (26) is placed at pre-determined position of the covering interpolation segment (25); steel balls (60) are filled between the steel ball seat (20) and the tailstock (30);

the tailstock (30) include a locking connection segment (31) with external thread for combining with integrated tools (not shown) or other device at one end, and a hex rod segment (32) at another end; a covering interpolation groove (33) is placed inside the hex rod segment (32) for housing and connecting the covering interpolation segment (25) of the steel ball seat (20); a thimble groove (34) and a ring groove (35) are placed at pre-determined position within the covering interpolation segment (25); the thimble groove (34) is stuffed with a leak-proof C type seal ring (70) to maintain the seal state of the space between the covering interpolation segment (25) of the steel ball seat (20) and the tailstock (30); the ring groove (35) of the tailstock (30) and the ring groove (26) of the steel ball seat (20) are correspondingly integrated to constitute space for filling in the steel balls (60); a bolt hole (36) is placed at outer portion of the hex rod segment (32) of the tailstock (30) for linking the ring groove (35); steel balls (60) are filled into the ring groove (35) through the bolt hole (36); and a bolt pillar (37) is installed to block the bolt hole (36).

According to the above design, through the stop-leak rubber ring (40) embedded within the holding groove (21) of the steel ball seat (20), the contact and seal relationship between the ball head (12) of the connector (10) and the holding groove (21) of the steel ball seat (20) is achieved; through the limit set by the friction ring (50) between the ball head (12) of the connector (10) and the holding groove (21) of the steel ball seat (20), the ball head (12) of the connector (10) will have limited arbitrary angle adjustment in the space margins between the holding groove (21) and the friction ring (5); the friction ring (50) made of wear-resistant material improves the wear and tear problems; moreover, through the effects of the steel balls (60) filled between the ring groove (26) of the steel ball seat (20) and the ring groove (35) of the tailstock (30), the steel ball seat (20) and the tailstock (30) are provided with relatively flexible rotation performance, and through the seal ring (70) stuffed inside the thimble groove (34) of the tailstock (30), space between the tailstock (30) and the steel ball seat (20) are kept water tight; the seal effects among the composed components of the quick plugging set, the arbitrary angle adjustment and the flexible rotation performance will respond to the diverse needs of a simple and practical structure of a quick plugging set of pneumatic tools.

Furthermore, because the ball head (12) of the connector (10) and the holding groove (21) of the steel ball seat (20) are connected and help in place by the installed friction ring (50), and because the thin cladding (23) extendedly installed at the steel ball seat (20) stamps and folds to limit the friction ring (50), the whole assembling and operations processes are made simpler; additionally, the friction ring (50) made of material with better wear resistance eliminates the problems of wearing and tearing and gaps produced in torsion angle change of the connector (10), effectively ensuring the seal and leak-proof effects, to solve various problems and shortcomings presented by conventional structure.

As shown by the above explanations, through the design of the present invention, the integrated operation of the quick plugging set is made simpler, excellent seal and leak-proof effects are achieved, the connector is provided with arbitrary torsion angle adjustment feature, and the tailstock is provided with flexible rotation performance. Thus, the invention will allow for all kinds of manipulation on its use. There will be excellent industrial usability and practical value that completely solve various problems and shortcomings existing in and derived from conventional products.

What is claimed is:

1. A quick plugging set of pneumatic tools comprising:

a connector, in which a quick plugging connector installed at one end of the connector is used for interpolating and connecting with piping, and another end is shaped as a ball head; a reducing diameter neck is formed at a convergence portion between the ball head and the said quick plugging connector allowing the ball head to be placed within a holding groove inside a steel ball seat;

one end of the steel ball seat includes a holding groove for holding the ball head of the connector, the outer end of the said holding groove is made of thin cladding with suitable width to cover the outer edge of a friction ring; the thin cladding will be stamped and folded after the ball head of the connector, a stop-leak rubber ring and the friction ring are put into the holding groove, thus combining the connector with the steel ball seats; another end of the steel ball seat consists of a covering interpolation segment with a reducing diameter for plugging into the tailstock, and a ring groove is placed at pre-determined position of the covering interpolation segment; and a tailstock includes a locking connection segment with external threads for combining with integrated tools at one end, and a hex rod segment with a covering interpolation groove inside it to connect with the covering interpolation segment of the steel ball seat at another end; a seal ring and a ring groove are placed at a pre-determined position within the covering interpolation groove, the ring groove and the ring groove of the steel ball seat correspondingly integrate to constitute a ring space; steel balls are inserted into the ring space;

through a combination relationship between the ball head of the connector and the steel ball seat, the connector is provided with an arbitrary torsion angle adjustment feature, and through the steel balls inserted between the steel ball seat and the tailstock ring groove, the steel ball seat and the tailstock are provided with a relatively flexible rotation feature.

2. The quick plugging set of pneumatic tools as claimed in claim 1, wherein a thimble groove is placed at a pre-determined portion in the holding groove of the steel ball seat, for being stuffed with a stop-leak rubber ring, and a step edge portion is formed at a convergence interface between the thimble groove and the thin cladding to restrict the friction ring put into the holding groove.

3. The quick plugging set of pneumatic tools as claimed in claim 1, wherein a thimble groove is placed at a pre-determined position of the covering interpolation groove of the tailstock, for being stuffed with a seal ring, to seal the space between the covering interpolation segment of the steel ball seat and the tailstock.

4. The quick plugging set of pneumatic tools as claimed in claim 1, wherein a bolt hole is placed at an outer portion of the tailstock for accessing the ring groove of the covering interpolation groove, to sequentially insert steel balls into the space formed between the steel ball seat and the tailstock ring groove, and to be blocked with a bolt pillar.

* * * * *